(12) United States Patent
Sikora et al.

(10) Patent No.: US 9,161,571 B2
(45) Date of Patent: Oct. 20, 2015

(54) APPARATUS FOR HANDLING BULK MATERIAL IN THE TOBACCO PROCESSING INDUSTRY, SCRAPER FOR SUCH APPARATUS AND METHOD OF HANDLING BULK MATERIAL

(75) Inventors: Leszek Sikora, Radom (PL); Bartosz Cieślikowski, Radom (PL); Radosław Figarski, Radom (PL); Tomasz Ryba, Radom (PL)

(73) Assignee: INTERNATIONAL TOBACCO MACHINERY POLAND SP. Z O.O. (PL)

( * ) Notice: Subject to any disclaimer, the term of this patent is extended or adjusted under 35 U.S.C. 154(b) by 0 days.

(21) Appl. No.: 14/232,283

(22) PCT Filed: Aug. 3, 2012

(86) PCT No.: PCT/PL2012/050026
§ 371 (c)(1),
(2), (4) Date: Jan. 16, 2014

(87) PCT Pub. No.: WO2013/022360
PCT Pub. Date: Feb. 14, 2013

(65) Prior Publication Data
US 2014/0174889 A1    Jun. 26, 2014

(30) Foreign Application Priority Data

Aug. 8, 2011   (PL) .......................................... 395906

(51) Int. Cl.
*B65G 45/14* (2006.01)
*A24D 3/02* (2006.01)
(Continued)

(52) U.S. Cl.
CPC ................ *A24D 3/02* (2013.01); *A24D 3/0225* (2013.01); *B65G 45/12* (2013.01); *B65G 45/14* (2013.01); *B65G 47/18* (2013.01); *B65G 47/52* (2013.01); *B65G 47/525* (2013.01); *B65G 47/843* (2013.01)

(58) Field of Classification Search
CPC ........ B65G 45/12; B65G 45/14; B65G 47/52; B65G 47/525; B65G 47/843
USPC ............ 198/494, 498, 377.04, 377.08, 471.1, 198/803.5, 364, 370.08, 689.1
See application file for complete search history.

(56) References Cited

U.S. PATENT DOCUMENTS 3,312,152 A    4/1967   Williamson
3,464,324 A    9/1969   Pinkham
(Continued)

FOREIGN PATENT DOCUMENTS

DE       1432720 A1    3/1969
DE       2062511 A1    7/1971
DE       2316692 A1    4/1974

OTHER PUBLICATIONS

International Search Report for International Application No. PCT/PL2012/050026 mailed on Jul. 9, 2013 (5 pages).
(Continued)

*Primary Examiner* — Leslie A Nicholson, III
(74) *Attorney, Agent, or Firm* — Oppedahl Patent Law Firm LLC (57) ABSTRACT

The object of the application is an apparatus for picking up a loose substance in the tobacco industry equipment comprising a loose substance feeding unit provided with a loose substance feeding tape and a picking up unit, characterized in that the picking up unit (6) is provided with vacuum pockets (7) cooperating with scrapers (30), whereas the vacuum pockets (7) together with the scrapers (30) are adapted to moving relative to the loose substance (2) feeding tape (3). In addition, the objects of the application are a scraper and a picking up method.

7 Claims, 7 Drawing Sheets

(51) Int. Cl.
  *B65G 47/52* (2006.01)
  *B65G 45/12* (2006.01)
  *B65G 47/18* (2006.01)
  *B65G 47/84* (2006.01)

(56) References Cited

U.S. PATENT DOCUMENTS

| | | | |
|---|---|---|---|
| 4,186,645 A | | 2/1980 | Zaydel |
| 4,861,324 A | | 8/1989 | Hirose et al. |
| 5,109,976 A | * | 5/1992 | Mohri et al. .......... 198/498 |
| 5,221,247 A | | 6/1993 | Budjinski, II et al. |
| 6,766,896 B1 | * | 7/2004 | Lee et al. .......... 198/497 |
| 7,516,837 B2 | * | 4/2009 | Teshima et al. .......... 198/495 |
| 8,167,114 B2 | * | 5/2012 | Khanania .......... 198/499 |

OTHER PUBLICATIONS

Written Opinion of the International Searching Authority for International Application No. PCT/PL2012/050026 mailed on Jul. 9, 2013 (7 pages).
Urząd Patentowy Rzeczypospolitej Polskiej (UPRP) Search Report dated Sep. 2, 2011 from application No. P.395906 filed Aug. 8, 2011.
UPRP Office Action dated Jul. 15, 2014 from application No. P.395906 filed Aug. 8, 2011.

\* cited by examiner

APPARATUS FOR HANDLING BULK MATERIAL IN THE TOBACCO PROCESSING INDUSTRY, SCRAPER FOR SUCH APPARATUS AND METHOD OF HANDLING BULK MATERIAL

The object of the application is an apparatus for picking up a loose substance in the tobacco industry equipment, a scraper for such apparatus and a method of feeding the loose substance.

In the machines for manufacturing multi-segment filters, there is the need of feeding multiple various filter segments from multiple feeding devices as well as the need of feeding filter materials in the loose form, such as granulated carbon. The filter material in the loose form, for reasons of simplification hereinafter referred to as loose substance, is fed to receiving spaces so called chambers, formed between filter segments placed on a partly rolled up cigarette paper, i.e. while forming a continuous filter rod which will be later cut into multi-segment filter rods. The loose substance is fed into spaces between the filter segments from above between deflected edges of the cigarette wrapping paper as disclosed in U.S. Pat. No. 4,186,645. From the DE2316692 document a solution is known according to which the loose substance is poured into spaces between segments through specially prepared holes in the cigarette paper covering from above the spaces between the segments as well as the segments themselves. Some of manufacturers of cigarette filters require and there is a demand for devices which precisely measure the portions of the loose substance and feed them to corresponding chambers between the filter segments at high speeds of movement of such chambers. From the description of DE2062511, an apparatus provided with a conveyor with pockets in the form of sleeves conveying a measured amount of the loose substance poured by gravity from a loose substance hopper is known. The loose substance is also by gravity poured into receiving spaces between the filter segments disposed on the cigarette paper for wrapping the continuous filter rod. The apparatus known from the U.S. Pat. No. 5,221,247 publication is provided with a plurality of pockets disposed on the conveyor of pockets into which by means of the vacuum the particles of the loose substance sucked from an air-permeable tape are inserted. The pockets move along a path situated parallel to the tape from which the loose substance is taken. After filling, the pockets are guided along a path situated above the path of motion of the segments placed on the cigarette paper in the form of a tape for wrapping filter segments, whereas the pockets are arranged directly opposite the receiving spaces or chambers between the segments.

Known solutions provided with pockets for the temporary storage of a measured amount of the loose substance are not designed for the operation at very high linear velocities which are required in view of the presently required efficiencies of machines for manufacturing multi-segment filters. The faster of the two solutions presented above is the one where the vacuum assists filling of the pockets for the temporary storage and measuring of portions of the loose substance (U.S. Pat. No. 5,221,247). The pockets take inside them the particles of the loose substance above which they move. Carried out tests proved that at the motion speeds of the pockets in the range of 300 m/min the vacuum causes the detachment of the particles from the ground, however, their further movement does not take place in a controlled manner and a part of the particles of the loose substance detached from the ground forms a cloud around the moving pockets and the particles are not capable of penetrating into the pockets.

The subject matter of the invention is an apparatus for picking up the loose substance in the tobacco industry equipment comprising a loose substance feeding unit provided with a tape feeding the loose substance, and a picking up unit, characterised in that the picking up unit is provided with vacuum pockets cooperating with scrapers. The pockets together with the scrapers are adapted to moving relative to the tape feeding the loose substance.

Preferably an apparatus according to the invention is characterised in that the pockets and scrapers are separable elements which outside of the area of the loose substance feeding tape are adapted to be guided on different paths.

Preferably an apparatus according to the invention is characterised in that the pockets cooperating with the scrapers are adapted to moving at a right angle to the loose substance feeding tape.

Preferably an apparatus according to the invention is characterised in that the pockets cooperating with the scrapers are adapted to moving askew to the loose substance feeding tape.

Preferably an apparatus according to the invention is characterised in that the pockets cooperating with the scrapers are adapted to moving along an arc relative to the loose substance feeding tape.

The subject matter of the invention is also a scraper for an apparatus for picking up loose substance in the tobacco industry equipment, characterised by comprising a scraping surface for scraping loose substance, a transport profile for receiving the material from the scraping surface and directing it towards an out-feed surface, and a surface feeding out loose material.

Preferably a scraper according to the invention is characterised in that the scraping surface has a rectangular or half-oval shape.

Preferably a scraper according to the invention is characterised in that the transport profile for receiving the loose material from the scraping surface and directing it towards the feed-out surface has an open, half-closed or closed form, with a vertical, broken or smooth configuration.

Preferably a scraper according to the invention is characterised in that the transport profile for receiving loose material from the scraping surface and directing it towards the feed-out surface has the shape of an elbow.

Preferably a scraper according to the invention is characterised in that the surface feeding out the loose material has a shape corresponding to the inlet of the vacuum pocket and is adapted to be connected with a pocket of a picking up unit.

The subject matter of the invention is also a method of picking up loose substance in the tobacco industry equipment comprising the steps in which the loose substance is fed by means of a feeding tape. The method according to the invention is characterised in that a picking up unit comprising vacuum pockets cooperating with the scrapers is guided in such a way that the picking up unit moves relative to a tape feeding the loose substance.

Preferably the method according to the invention is characterised in that in addition the vacuum pocket and the scraper are separated. Outside of the area of the feeding tape the scraper and the vacuum pocket are guided on different paths.

Preferably the method according to the invention is characterised in that the picking up unit, provided with a vacuum pocket cooperating with the scraper, is guided in such a way that the picking up unit moves at a right angle to the tape feeding the loose substance.

Preferably the method according to the invention is characterised in that the picking up unit, provided with a vacuum pocket cooperating with the scraper, is guided in such a way that the picking up unit moves along an arc relative to the tape feeding the loose substance.

The use of the scrapers limits the possibility of movement of the loose substance particles in any other direction than towards the inlet of the hopper, resulting in the increase of the repeatability of measurement of portions of the loose substance fed to one pocket. As a result, the efficiency of picking up of the particles by the hoppers increases, which permits to fill them in a shorter way. In addition, in case of a diversified gradation of the loose substance particles, the effectiveness of picking up of the loose substance particles is increased. An apparatus according to the invention provides also the possibility of arrangement of the pockets in a non-uniform way, i.e. successive pockets may be spaced at different distances.

The object of the invention has been presented in a preferred embodiment in a drawing in which:

FIG. 1 shows an apparatus for feeding a loose substance to a device manufacturing multi-segment filters. The apparatus is provided with a hopper 1 for a loose substance 2 which can be a granulated carbon or generally a loose filter material. Beneath the hopper 1 a tape 3 feeding the loose substance 2 emerging from the hopper 1 is situated. The tape 3 together with the hopper 1 constitute a loose substance 2 feeding unit 4. Above an upper surface 5 of the tape 3, a picking up unit 6 for conveying the loose substance 2 from the loose substance feeding unit 4 to the device manufacturing multi-segment filters is situated, whereas in the drawing the filter manufacturing device itself is not shown, but only a multi-segment continuous filter rod 10, which is formed in the device and moves in the direction indicated by an arrow shown next to the continuous filter rod, is represented. The picking up unit 6 for conveying the loose substance is provided with a plurality of pockets 7 for receiving, storage and conveyance of measured portions of the loose substance 2 from a loose substance picking up area 9 to receiving spaces 8 (FIG. 2) of the formed multi-segment continuous filter rod 10. The receiving spaces 8 are limited by filter segments 12, 13, whereas the loose substance can be poured between the segments 12, 13 before wrapping the cigarette paper, and in case of a perforated cigarette paper 14 after pre-wrapping the segments, through holes 16. The pockets 7 are attached to a conveyor 15, whereas for reasons of simplification the guide rollers and the drive of the conveyor have not been shown. The path of motion of the pockets 7 runs through the loose substance picking up area 9, whereas the pockets 7 move together with scrapers 30 of a unit 11 supporting the insertion of the loose substance, which will be hereinafter discussed, along a part of a vacuum supply unit 17. The vacuum supplied by the unit 17 is necessary for inserting the loose substance into the pockets and for holding the loose substance inside the pockets until the moment when the loose substance is fed into the receiving spaces 8 of the formed continuous filter rod 10. The vacuum supply unit 17 extends from point 18 to point 19 perpendicular to the direction of movement of the feeding tape 3. The path of motion of the pockets 7 situated parallel to the rectilinear unit 17 is also situated perpendicular to the direction of movement of the feeding tape 3, although also an embodiment is possible where the pockets 7 move slantwise to the loose substance feeding tape 3. Filling of the pockets 7 is effected by means of the scrapers 30 of the unit 11 supporting the insertion of the loose substance into the pockets 7 of the picking up unit 6. In the area 9 above the upper surface 5 of the tape 3 the pockets 7 and the scrapers 30 move on a common path. Then the pockets 7 are guided to an area 20 of feeding the loose substance 2 to the receiving spaces 8, and the scrapers 30 are shifted on a separate path back to the area 9 so that before the entrance to the area 9, that is before the point 18, they move already together with the pockets 7. On the other hand, the pockets 7 moving already without the scrapers, after entering the area 20 move along a unit 21 supplying overpressure which is necessary to transfer the loose substance from the pockets 7 to the receiving spaces 8. The overpressure supply unit 21 extends from point 19 to point 22.

Figure 1:
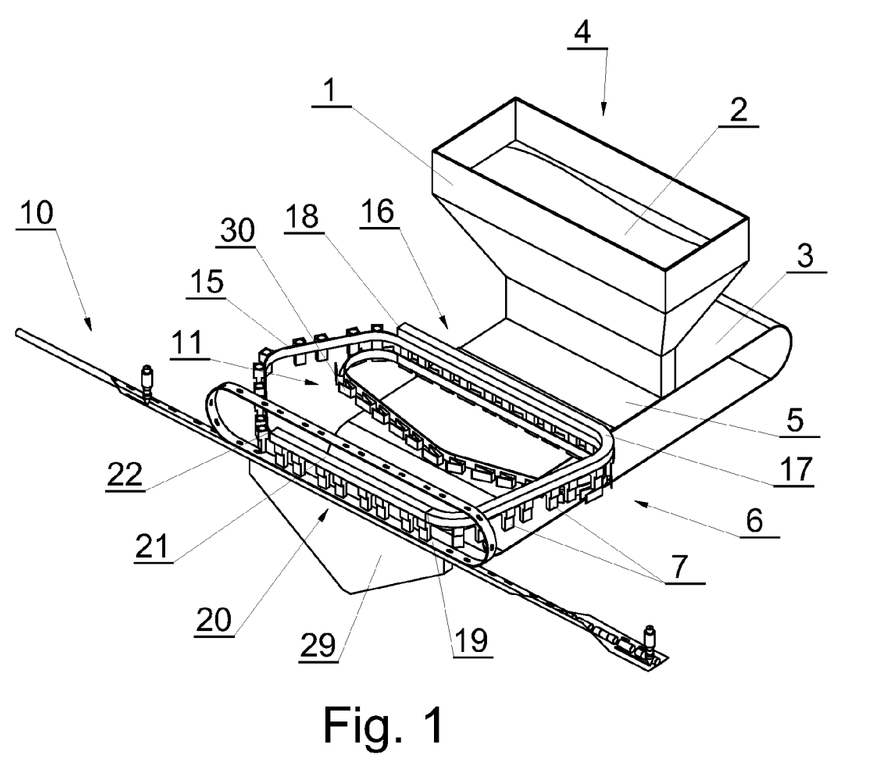
FIG. 1 shows a view of an apparatus according to the invention.
Figure 2:
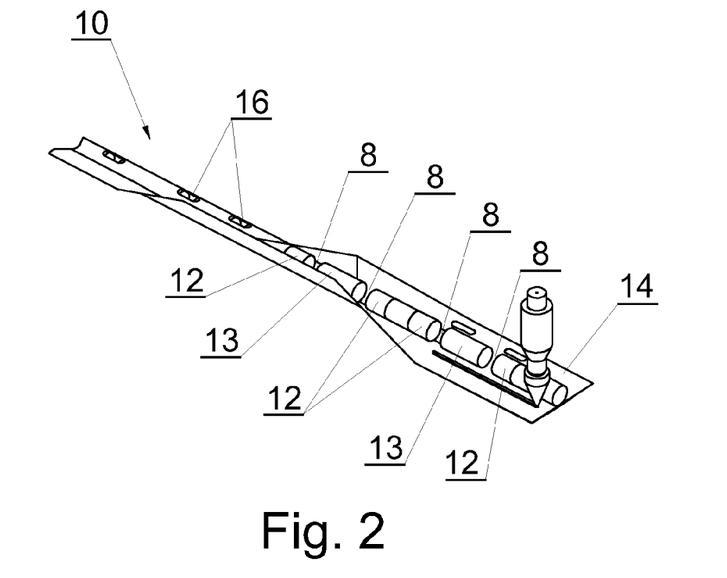
FIG. 2 shows a view of a formed multi-segment continuous filter rod.
Figure 3:
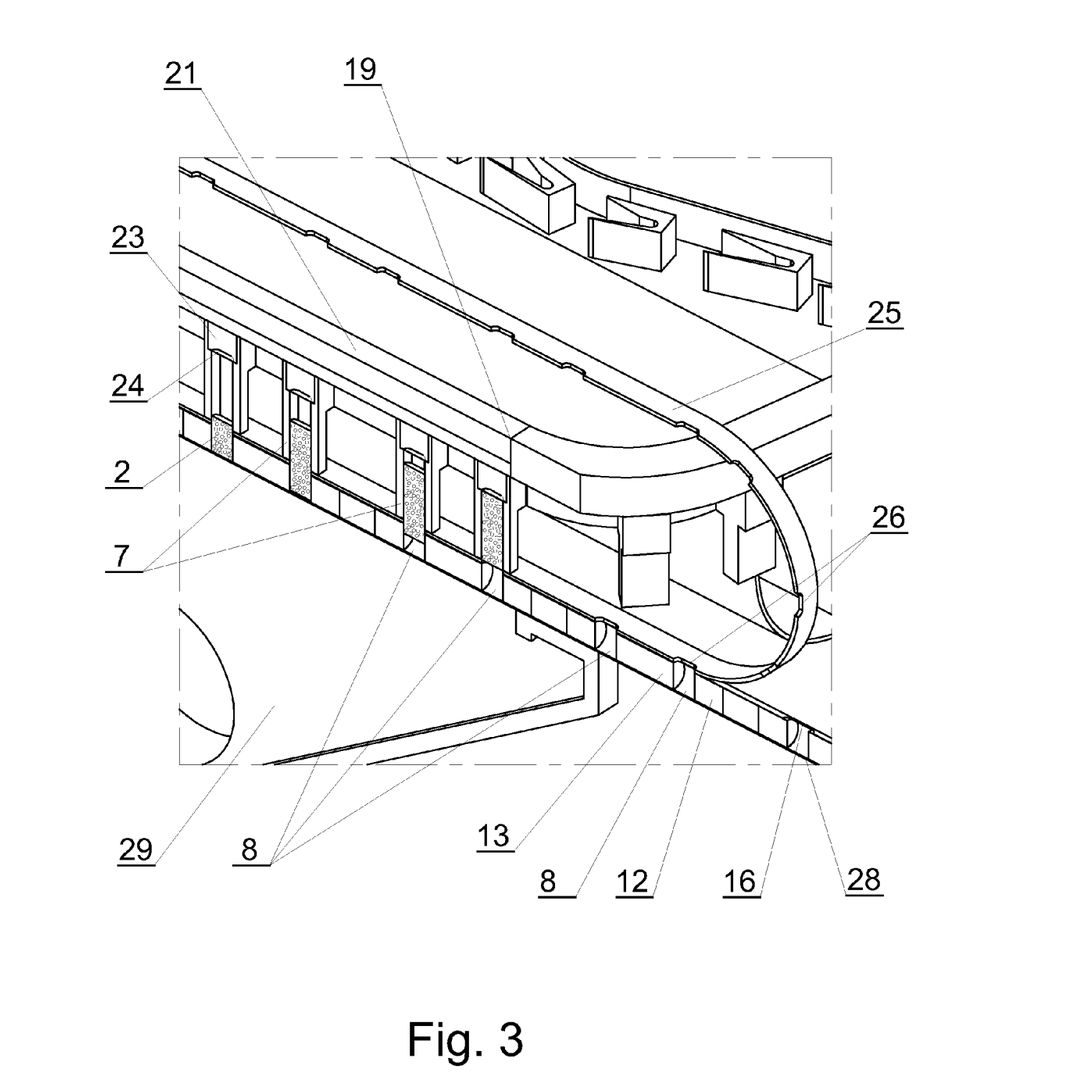
FIG. 3 shows a cross-sectional view of pockets of an apparatus according to the invention.

FIG. 3 shows the vacuum pockets 7 in a cross-sectional view during the feeding of the loose substance 2 to the receiving spaces 8 through the holes 16, whereas the feeding of the loose substance is assisted by the overpressure supplied from the overpressure supply unit 21 to chambers 23 separated from the loose substance 2 by an air-permeable element 24 which is, however, not permeable to the loose substance. In order to seal the flow of the loose substance and eliminate the risk of spilling the loose substance to the sides, above the formed continuous filter rod 10 a tape 25, provided with holes 26 which are situated directly opposite the holes 16 and directly opposite the outlets of the pockets 7, is synchronically moved, with the speed of movement of the rod 10. In the area 20 of feeding the loose substance to the receiving spaces 8, beneath the formed continuous filter rod 10 moving on an air-permeable format tape 28, a vacuum supply unit in the form of a vacuum chamber 29 is disposed. The vacuum coming from the vacuum chamber 29 additionally supports the feeding of the loose substance to the receiving spaces 8.

Figure 4:
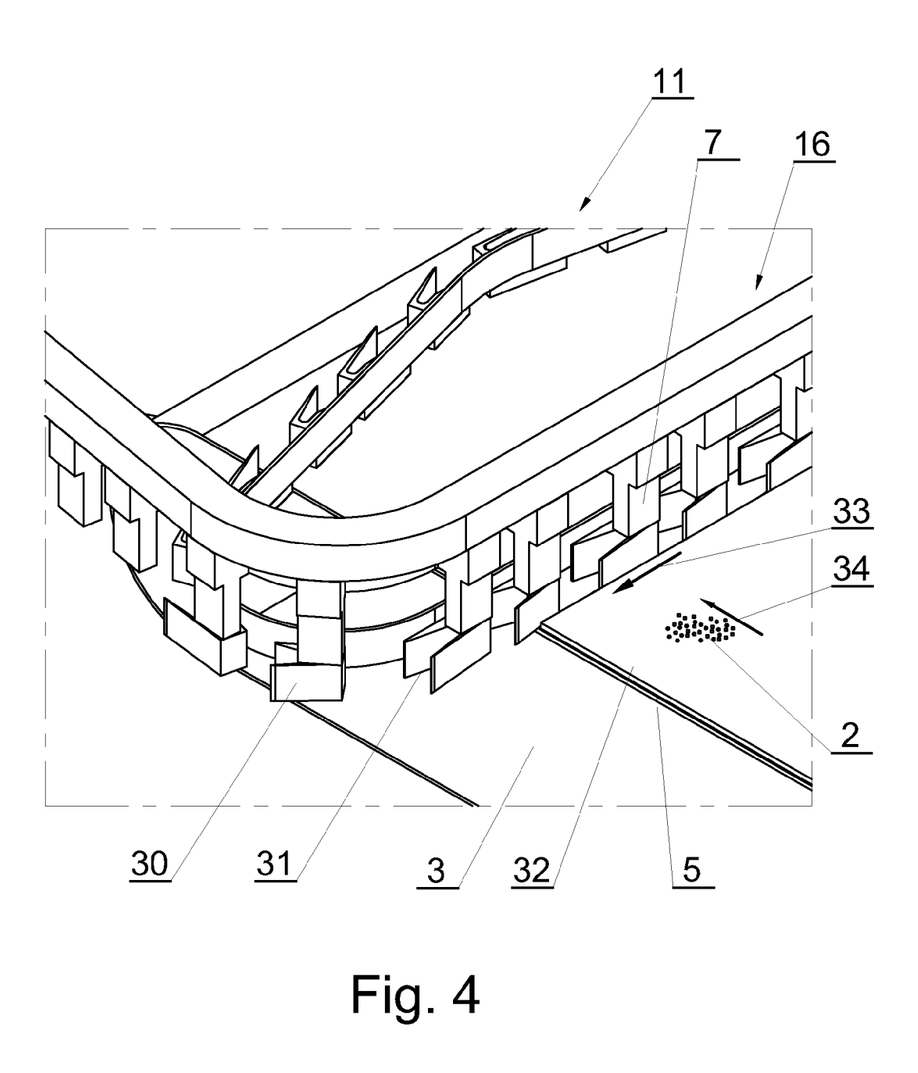
FIG. 4 shows scrapers according to the invention.

The unit 11 supporting inserting and directing of the loose substance 2 to the pockets 7 is provided with a plurality of scrapers 30 the scraping edges 31 (FIG. 4) of which move above the upper surface 5 of the tape 3, whereas the scraping edges 31 are positioned in such a way as to move within a layer 32 of the loose substance 2. The arrow 33 shows the direction of movement of the scraper 30 relative to the surface 5, on which the layer 32 of the loose substance 2 is situated, the direction of movement of which is shown by the arrow 34. For a determined speed of movement of the pockets 7 together with the scrapers 30, and for a determined speed of movement of the layer 32 of the loose substance 2 each of the scrapers 30 takes and delivers to the pockets 7 a measured repeatable amount of the loose substance. On the other hand, by changing the thickness of the layer 32 of the loose substance 2 or by changing the speed of movement of the tape 3 the volume of fed portion of the loose substance can be adjusted.

The scrapers 30 according to the invention can take many different forms, however, three fundamental elements can be distinguished therein: a scraping surface A through which the loose substance 2 is received, a transport profile 34, 36 and an out-feed surface B. FIG. 5-10 show different possible forms of the scraper 30 according to this invention.

The scraping surface A is a separated area of the space through which the loose substance 2 is picked up, whereas the scraping surface A is determined by the edges 31, 31A, 31B, 31C, 31D and has a rectangular or half-oval shape. This surface is most frequently limited by the edges of the scraper 30, however, e.g. in an open configuration (FIG. 5) the scraping surface A is the space above the working edge, in a half-closed configuration (FIG. 6-9) it is the space determined by the edges of the side walls, while in a closed configuration (FIG. 10) it is the space determined by the edges of the side walls and of the upper wall of the scraper 30.

The out-feed surface B is determined by an edge 35 which has a configuration enabling it to cooperate with the vacuum pocket 7. The out-feed surface B can be also determined by an edge 38A, 38B, 38C, 38D and 35E which has a configuration enabling it to cooperate with the vacuum pocket 7 the inlet profile of which is determined by the edge 35.

The transport profile 34, 36 is a surface which directs the loose substance 2 from the scraping surface A, through which the scraper 30 picks up the loose substance 2, to the out-feed surface B which has a shape corresponding to the inlet of the vacuum pocket 7. The transport profiles 34, 36 can have different shapes selected for specific parameters of the loose substance 2.

In the embodiments it is possible to give to the transport profile 34, 36 different shapes than those shown in FIGS. 5 to 10, for instance circumscribed by a broken or smooth curve with a different shape e.g. circumscribed by a hyperbolic or a straight curve with an appropriate slope, besides the transport profile 34, 36 can take the shape of a vertical wall.

Figure 5:
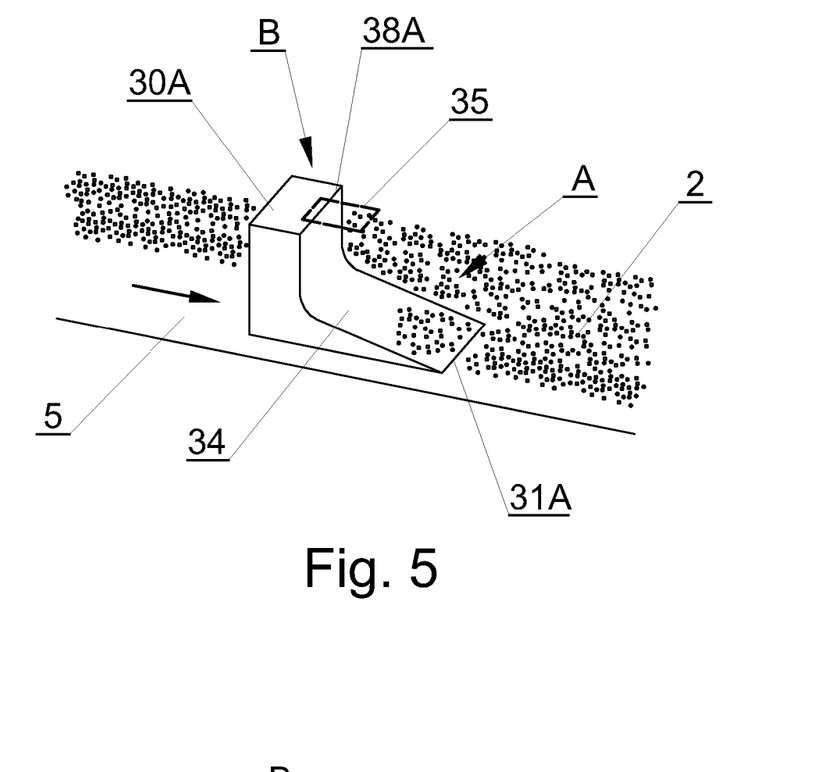
FIG. 5 shows the first embodiment of a scraper according to the invention.
Figure 6:
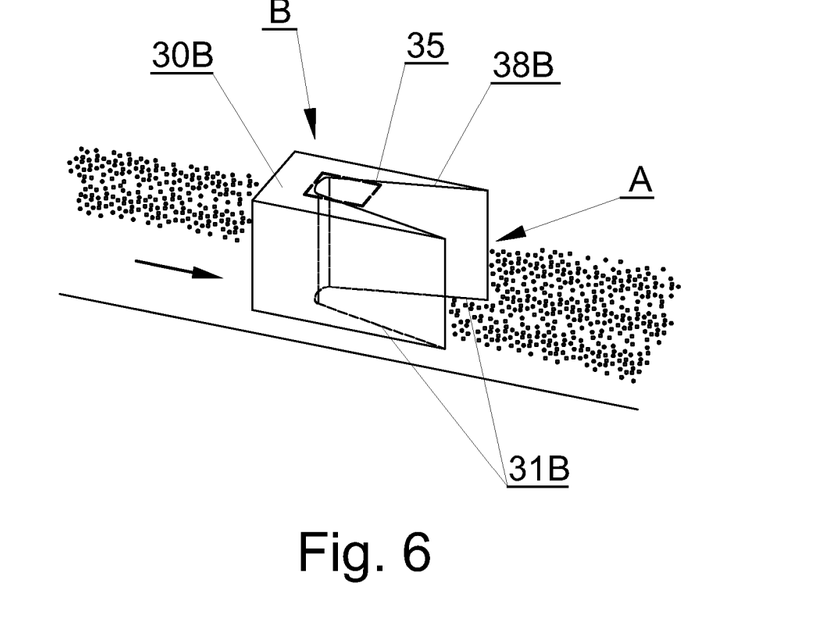
FIG. 6 shows another embodiment of a scraper according to the invention.
Figure 7:
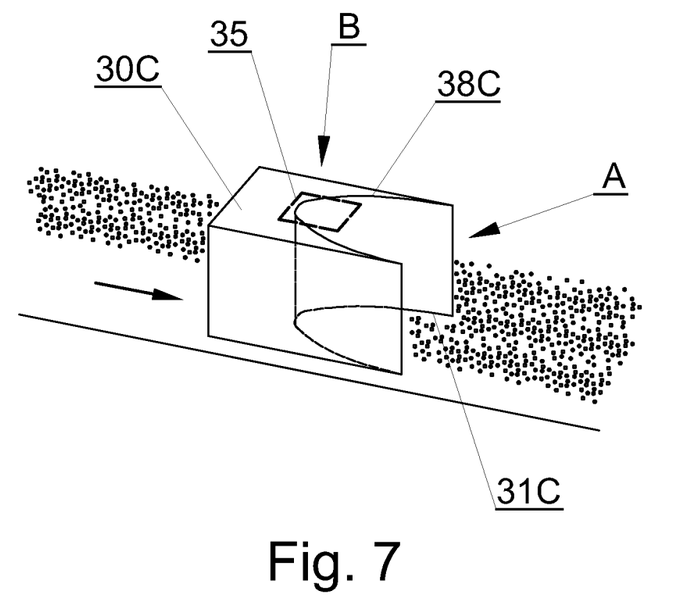
FIG. 7 shows another embodiment of a scraper according to the invention.
Figure 8:
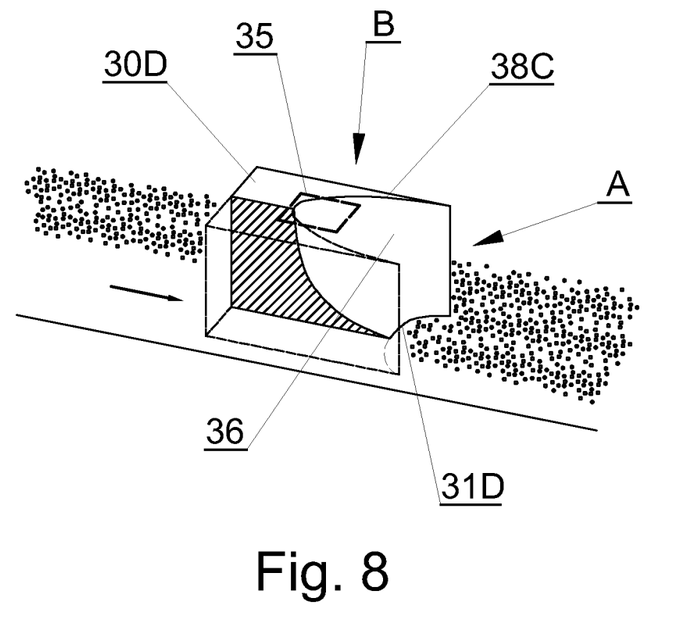
FIG. 8 shows another embodiment of a scraper according to the invention.
Figure 9:
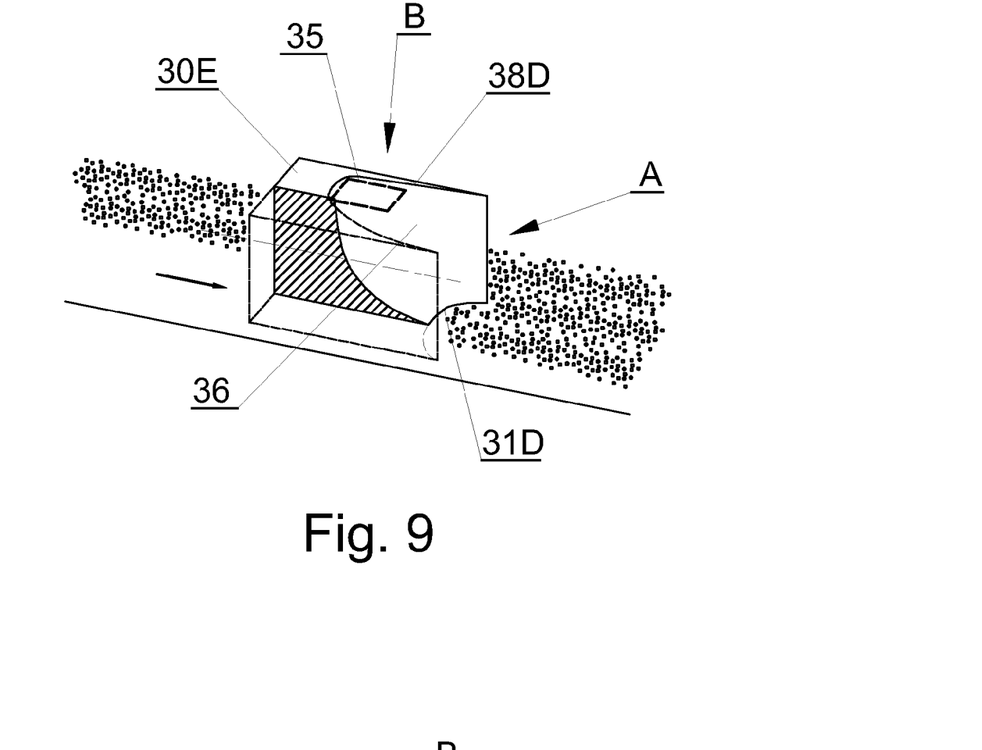
FIG. 9 shows another embodiment of a scraper according to the invention.
Figure 10:
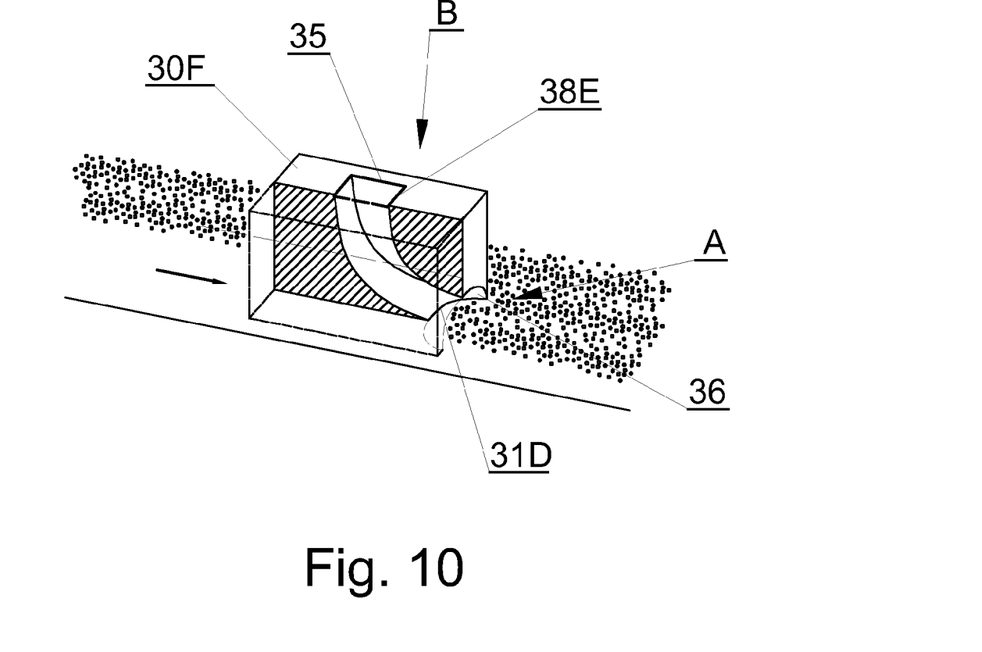
FIG. 10 shows another embodiment of a scraper according to the invention.

Furthermore, the scraper 30 itself can have an open form, where the transport profile 34, 36 is not closed by side walls as shown in FIG. 5, but can also have a half-closed form where the transport profile 34, 36 is limited by side walls, see FIG. 6-9. What is more, in some embodiments the scraper 30 can have a closed form where the transport profile 34, 36 is limited not only by side walls, but is also closed from above by an upper wall as shown in FIG. 10.

Figure 11:
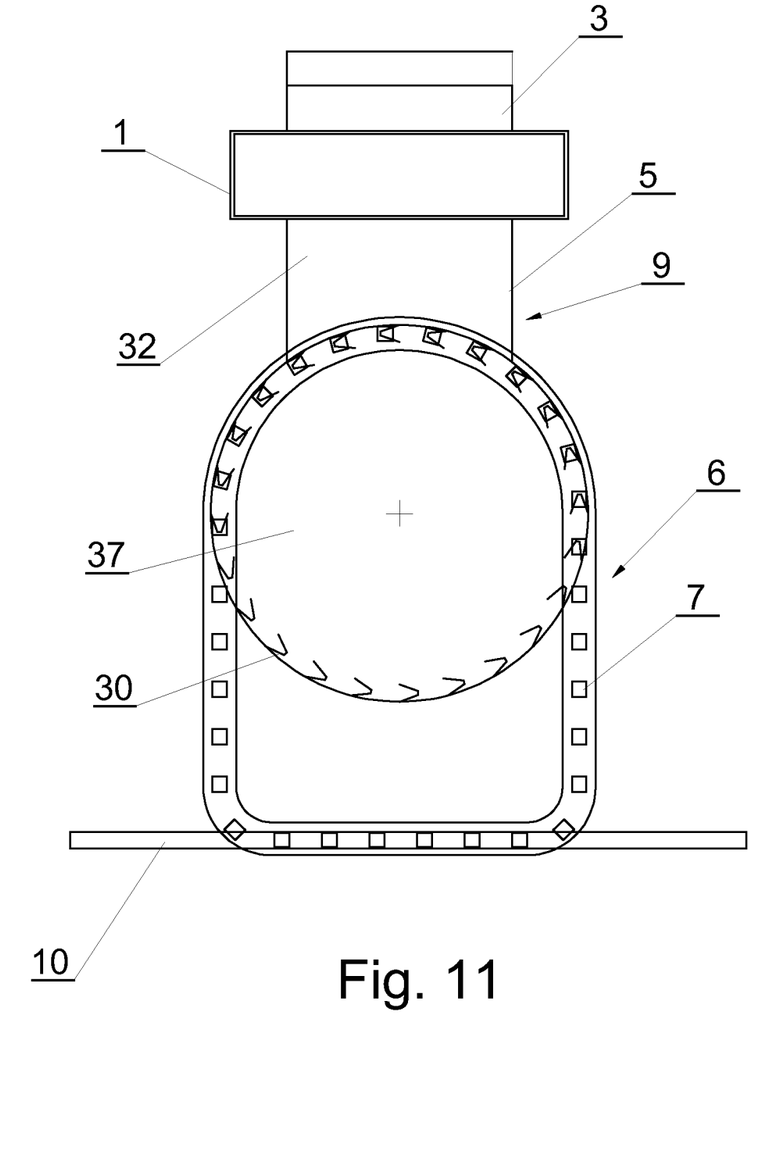
FIG. 11 shows schematically another embodiment of an apparatus according to the invention

FIG. 11 shows a simplified view of another embodiment of the apparatus where the pockets 7 of the unit 6 for picking up the loose substance 2 together with the scrapers 30 move in the picking up area 9 on a circular path. The scrapers 30 of the unit supporting picking up and directing of the loose substance are disposed on a circular conveyor 37 and are spaced on a circle with a diameter corresponding to the diameter of the circle on which the vacuum pockets 7 move. The path of motion of the pockets 7 consists of a circular fragment and rectilinear sections.

The invention claimed is:

1. An apparatus for picking up loose substance in the tobacco industry equipment comprising a loose substance feeding unit provided with a loose substance feeding tape and a picking up unit wherein
    the picking up unit (6) is provided with vacuum pockets (7) cooperating with scrapers (30), and wherein
    the vacuum pockets (7) together with the scrapers (30) are adapted to moving relative to the loose substance (2) feeding tape (3);
    wherein the vacuum pockets (7) and the scrapers (30) are separate elements which are adapted to be guided on different paths outside the area of the loose substance (2) feeding tape (3).

2. The apparatus according to claim 1 wherein the vacuum pockets (7) cooperating with the scrapers (30) are adapted to moving at a right angle to the loose substance (2) feeding unit (3).

3. The apparatus according to claim 1 wherein the vacuum pockets (7) cooperating with the scrapers (30) are adapted to moving askew to the loose substance (2) feeding unit (3).

4. The apparatus according to claim 1 characterised in that the vacuum pockets (7) cooperating with the scrapers (30) are adapted to moving along an arc relative to the loose substance (2) feeding unit (3).

5. A method of picking up loose substance in tobacco industry equipment comprising steps of feeding the loose substance by means of a feeding tape; and
    guiding a picking up unit (6) comprising vacuum pockets (7) cooperating with scrapers (30) relative to a loose substance (2) feeding tape (3);
    wherein when the vacuum pockets (7) and the scraper (30) are separated, the step of guiding the scraper and the vacuum pocket is performed on different paths outside of the feeding tape.

6. The method according to claim 5 wherein the step of guiding the picking up unit (6) is at a right angle to the loose substance (2) feeding tape (3).

7. A scraper for an apparatus for picking up loose substance in tobacco industry equipment comprising:
    a scraping surface (A) determined by edges (31, 31A, 31B, 31C, 31D) for scraping loose substance (2),
    a transport profile (34, 36) for receiving loose substance (2) from the scraping surface (A) and directing it towards an out-feed surface (B),
    a surface (B) feeding out loose substance (2), and
    wherein the surface (B) feeding out the loose substance (2) has a shape corresponding to the inlet of a vacuum pocket (7) and is adapted to be connected with the vacuum pocket (7) of a picking up unit (6).

* * * * *